(12) United States Patent
Poornachandran et al.

(10) Patent No.: US 9,245,036 B2
(45) Date of Patent: Jan. 26, 2016

(54) MECHANISM FOR FACILITATING CUSTOMIZED POLICY-BASED NOTIFICATIONS FOR COMPUTING SYSTEMS

(75) Inventors: Rajesh Poornachandran, Portland, OR (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 13/609,722

(22) Filed: Sep. 11, 2012

(65) Prior Publication Data
US 2014/0074921 A1  Mar. 13, 2014

(51) Int. Cl.
*G06F 15/16* (2006.01)
*G06F 17/30* (2006.01)
*G06Q 10/10* (2012.01)
*H04L 12/58* (2006.01)

(52) U.S. Cl.
CPC ........ *G06F 17/30867* (2013.01); *G06Q 10/109* (2013.01); *H04L 51/24* (2013.01); *G06F 15/16* (2013.01)

(58) Field of Classification Search
None
See application file for complete search history.

(56) References Cited

U.S. PATENT DOCUMENTS

| 6,745,193 | B1 * | 6/2004 | Horvitz et al. ................ 707/796 |
| 7,631,047 | B1 * | 12/2009 | Adamczyk et al. ........... 709/207 |
| 7,844,666 | B2 * | 11/2010 | Horvitz et al. ................ 709/206 |
| 2002/0087649 | A1 * | 7/2002 | Horvitz ............... G06Q 10/107 709/207 |
| 2002/0167488 | A1 * | 11/2002 | Hinckley .............. G06F 1/1626 345/156 |
| 2003/0229722 | A1 * | 12/2003 | Beyda .................. G06Q 10/107 719/310 |
| 2009/0249095 | A1 * | 10/2009 | Poornachandran et al. .. 713/320 |
| 2012/0084344 | A1 * | 4/2012 | Kalyanasundaram et al. ............................ 709/203 |
| 2013/0117381 | A1 * | 5/2013 | Garcia et al. .................. 709/206 |

* cited by examiner

Primary Examiner — Chris Parry
Assistant Examiner — Caroline Jahnige
(74) Attorney, Agent, or Firm — Blakely, Sokoloff, Taylor & Zafman LLP

(57) ABSTRACT

A mechanism is described for facilitating customized policy-based notifications at computing systems according to one embodiment. A method of embodiments of the invention includes managing, at a computing device, data including at least one of power-aware data and context-aware data, dynamically customizing, at the computing device, notification policies based on the managed data, and generating, at the computing device, policy-based notifications based on the customized notification policies, and transmitting the policy-based notifications to facilitate communication of the policy-based notifications. The policy-based notifications may include at least one of a power-aware notification and a context-aware notification.

21 Claims, 6 Drawing Sheets

MECHANISM FOR FACILITATING CUSTOMIZED POLICY-BASED NOTIFICATIONS FOR COMPUTING SYSTEMS

FIELD

Embodiments of the invention relate to messaging systems. More particularly, embodiments of the invention relate to a mechanism for facilitating customized policy-based notifications for computing systems.

BACKGROUND

Conventional messaging systems provide notifications (e.g., short message system (SMS), alerts, etc.) that are unintelligent, inefficient, and consume a great deal of power, particularly with regard to mobile computing device (e.g., smartphones).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
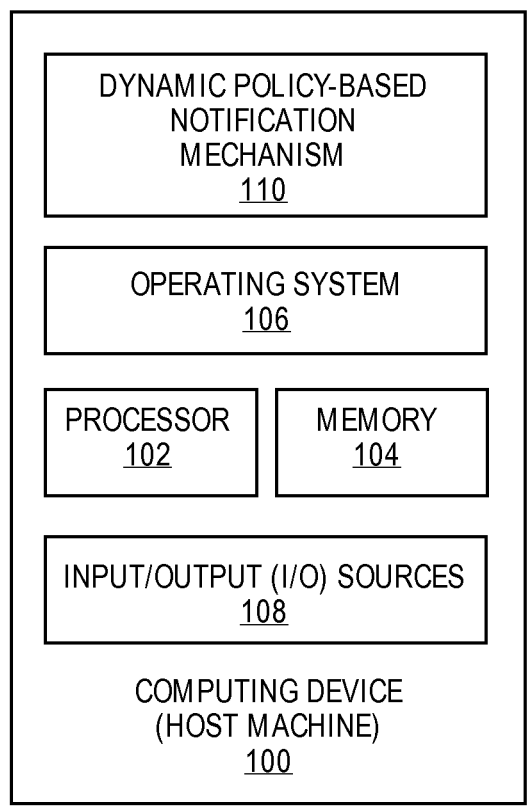
FIG. 1 illustrates a dynamic policy-based notification mechanism employed at a computing device according to one embodiment.

In the following description, numerous specific details are set forth. However, embodiments of the invention may be practiced without these specific details. In other instances, well-known circuits, structures and techniques have not been shown in details in order not to obscure the understanding of this description.

In one embodiment, a mechanism is provided for facilitating dynamic, customized and policy-based notifications (e.g., SMS or texts, alarms, reminders, alters, etc.) at computing devices (e.g., mobile computing devices, such as smartphones, tablet computers, etc.). For example and in one embodiment, the mechanism may be employed at a computing system (e.g., server computer) and work with a mobile computing device-based mechanism over a network (e.g., Internet, cloud network, etc.) to perform various tasks relating to dynamic and context-aware notifications. Such tasks will be further described later in the document and may include, but are not limited to, context-aware notifications, power-aware notifications, device context-based filtering of notifications, user context-based filtering of notifications, customization of notifications, speech- and voice-based notifications, and the like.

For example, in conventional notification systems, when a text message is received at a mobile computing device, the display screen is lit even when the message only occupies a fraction (e.g., 20%) of the screen, which wastes a significant amount of power resources. Further, conventional notification systems are not context-aware, such as the display screen stay lit even when the mobile device is in user's pocket and the message is not being read by the user. Additional, conventional notification systems are strictly based on user touch control and does not allow for other ways to acknowledge notifications.

In one embodiment, the dynamic policy-based notification mechanism efficiently manages and saves the computing device's power as it relates to displaying notifications such that merely a portion of the screen (such as the fraction of the screen that is occupied by a text message) is lit as opposed to lighting the entire display screen. Further, in one embodiment, notifications are provided based on device context-aware (e.g., device is off, devices is in a purse, etc.) and/or user context aware (e.g., user is scheduled to be in a meeting or sleeping, etc.). In one embodiment, in addition to providing display/graphical notifications, the mechanism further provides voice-activated and/or sound-based notifications.

In one embodiment, policy-based notifications may include any combination of context-aware notifications and power-aware notifications such that notification policies may be formed, customized, and recommended for each notification that is provided through a computing device (e.g., mobile device). In one embodiments, context-aware notifications may include (mobile) computing device-based context-aware notifications (e.g., smartphone is turned off or put in airplane-mode, smartphone is put in a pocket or purse, tablet computer is in a backpack, etc.) and/or user-based context-aware notifications (e.g., user is in a business meeting or having family time, user is in a theater or playing a sport, etc.). As aforementioned, policy-based notifications further include power-aware notifications that include notifications that are recommended to save the mobile device power, such as by occupying only a small section (e.g., 20%) of the display screen to provide a text message or an alert, sounding a noise (e.g., beep, alarm, etc.), placing a call notification to the user though his or her own mobile device, calling the user's Bluetooth device instead of display the notification on the mobile device, etc.

FIG. 1 illustrates a dynamic policy-based notification mechanism 110 employed at a computing device 100 according to one embodiment. Computing device 100 serves as a host machine to employ dynamic notification mechanism ("notification mechanism") 110 to facilitate dynamic and context-aware notifications (e.g., SMS or texts, alarms, reminders, alters, etc.) at computing devices (e.g., mobile computing devices, such as smartphones, tablet computers, etc.). Computing device 100 may include mobile computing devices, such as cellular phones including smartphones (e.g., iPhone® by Apple®, BlackBerry® by Research in Motion®, etc.), other phones (e.g., landlines), handheld computing devices, personal digital assistants (PDAs), etc., tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "client", "host", "server", "memory server", "machine", "device", "computing device", "computer", "computing system", and the like, may be used interchangeably throughout this document.

Figure 2A:
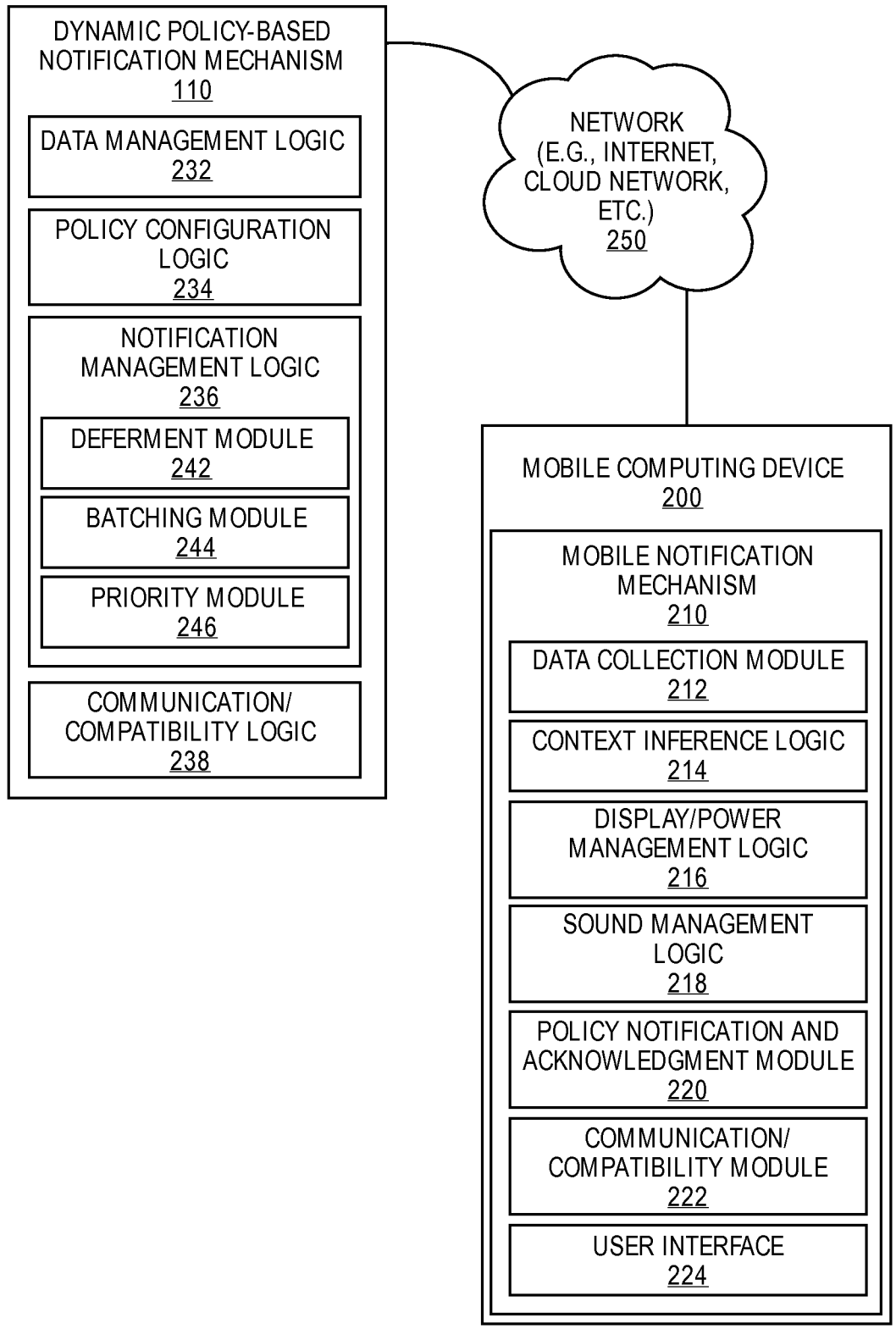
FIG. 2A illustrates a dynamic policy-based notification mechanism and a mobile notification mechanism according to one embodiment.

FIG. 2A illustrates a dynamic policy-based notification mechanism 110 and a mobile notification mechanism 210 according to one embodiment. In one embodiment, notification mechanism 110 may include a number of components, such as data management logic 232, policy configuration logic 234, communication/compatibility logic 238, and notification management logic 236 having deferment module 242, batching module 244, and priority module 246. In one embodiment, notification mechanism 110 may be server-based, such as employed at a server computer (e.g., computing device 100 of FIG. 1) and may be in communication with a mobile notification mechanism 110 employed at another computing device 200, such as a mobile computing device (e.g., smartphone, a tablet computer, laptop computer, etc.) over one or more networks (e.g., Internet, cloud network, 3G, etc.). Similarly, in one embodiment, mobile notification mechanism 210 includes a number of components, such as data collection module 212, context inference logic 214, display/power management logic 216, sound management logic 218, policy notification and acknowledgement module (policy module) 220, communication/compatibility module 224, and user interface 224.

In one embodiment, notification mechanism 110 facilitates mobile notification mechanism 210 to perform certain context-aware notification tasks, such as context data relating to user context and/or device context may be collected or aggregated via data collection module 212. For example, a sensor (such as a camera, a proximity sensor, an ambient sensor, etc.) at mobile device 200 (e.g., smartphone) may detect or scan and know that the user has put the mobile device 200 in her/her pocket/purse. The information is collected by data collection module 212 that is contact with the sensors, and forwards the information on to context inference logic 214 that infers from that piece of information that the user may not be in a position to see the display of incoming notifications (e.g., text messages). The information is then provided to data logic management 232 at notification mechanism 110 to further mine the data in light of other available information.

For example, data management logic 232 may check the user's calendar to see that the user is scheduled to attend a business meeting about 5 minutes after the user puts the mobile device 200 in the pocket. This information may then be provided by data management logic 232 to policy configuration logic 234 to customize or form a policy that for 5 minutes prior to the business meeting, the user may be provided an audio notification of any incoming messages and maintain silence during the business meeting followed by a resumption of display and/or sound notifications based on the then determined user and device contexts and other relevant and available data. This policy is forwarded by policy configuration logic 234 to policy module 220 so it may be shared with and implemented by relevant components, such as display/power management logic 216 (to provide a dimmed message, such as to lit only the message space (as opposed to the entire display screen) to save power, etc.), sound management logic 218 (to play a sound (as opposed to displaying the notification) when the display screen might not be available or in use or set to be off, such as when the mobile device 200 is placed in the user's pocket or when intentionally turned off by the user).

Continuing with the above example, the user may have provided additional information to serve as exceptions to rules, such as he/she may not be disturbed during the business meeting, except in case of emergencies and/or notifications from other devices used or owned by family members. It is contemplated and in one embodiment, user context (e.g., user is playing basketball, sleeping, in a meeting, busy with family, at a theater, etc.) and device context (e.g., device is off, in a roaming area, outside service area, in airplane mode, etc.) may not be limited to or based on immediate user/device actions (e.g., user is driving, device dropped in a toilet, etc.), but that other relevant data may be obtained from available information to form and implement dynamic and context-aware notification policies that are customized for each subscribing user and/or computing device. Some examples of the available information may include user's calendar, travel schedule, history of use, family/business commitment history, service contract, knowledge of roaming areas (as, for example, obtained from the service contract by data management logic 232 and tracked through a global positioning system (GPS) sensor of mobile device 200 and aggregated by data collection module 212 and inferred by context inference logic 214, etc.).

In one embodiment, notification management logic 236 may recommend mobile notification mechanism 210 one or more appropriate notifications to be issued to the user based on the policy customized by policy configuration logic 234. For example, these notification recommendations or schemes facilitate dynamic notifications, being sounded and/or displayed, at mobile device 200 using policy module 220 along with display-power management logic 216 and/or sound management logic 218 and other relevant components (e.g., power management logic, graphics processor, display memory (e.g., local memory associated with a display screen), one or more sensors, etc.) of mobile device 200. Further, it is contemplated that notifications may be provided through a display screen, speaker, etc. In some embodiments, sound-based notifications provided by sound management logic 218 may involve speech-based notifications where the user is called by own mobile device 200. It is contemplated that the user may accept the call to listen to the notification or save it for later or simply ignore and/or delete the message.

For example, using dynamically deciding next notifications schemes, a particular notification, such as a display notification, may be recommended and displayed on the display screen of mobile device 200, but if, for example, the user does not respond, the previously-recommended notification may be dynamically changed to include sound and thereafter, another notification (having both the graphics and audio) be provided. If the user still does not respond, mobile notification mechanism 210 may assume the user is not available and rely on one or more sensors (e.g., ambient noise, user and/or device movement, etc.) of mobile device 200 to collect more information about the user and/or mobile device 200 to provide to notification mechanism 110 to recommend another notification (e.g., a combination of graphics, sound and vibrate, etc.) to be provided to the user and continue on until receiving an acknowledgement from the user and/or a predetermined time period has expired (e.g., one minute) and/or an exception or condition (e.g., no notifications allowed after 10 pm) is triggered.

For example, certain notifications may be filtered or prioritized along with being customized, such as certain events (e.g., business calls, calls from kids' schools, etc.) and individuals (e.g., family members) may have priority over others. For example and in some embodiments, such priorities may be taken into consideration by policy configuration logic 234 using notification management logic 236 to provide a specific notification recommendations to mobile notification mechanism 210. For example, certain unimportant notifications (e.g., marketing messages, messages from distant friends, etc.) may be deferred for certain amount of time (e.g., until after the user is done with dinner or vacation, upon expiration of a predetermined time period, etc.) using deferment module 242. Similarly, using batching module 244, certain notifications (e.g., messages from a child's school, messages from a car dealership, messages from individual clients, etc.) may be batched together and provided as such or as configured or requested by the user. Priority module 246 may be used to prioritize and expedite the certain notifications as configured by the user, such as any notifications from immediate family members or certain friends and clients may be recommended to have priority over other notifications and may be expedited. For example, a notification from a spouse or a child may be set to be provided (e.g., with display and sound and vibrate) to the user despite the known user context (e.g., user in a business meeting) and/or device context (e.g., device in a backpack).

Communication/configuration logic 238 facilitates the ability to communicate with various other devices (e.g., mobile computing devices (such as various types of smartphones, tablet computers), websites, (such as social networking websites (e.g., Facebook®, LinkedIn®, Google+®, etc.)), other networks, etc.), while ensuring compatibility with such devices as well as changing technologies, parameters, protocols, standards, etc. Similarly, at mobile computing device 200, communication/configuration module 222 facilitates communication between mobile notification mechanism 210 and various mobile device-based devices (e.g., sensors, display screen, etc.) and other devices (e.g., other computing devices) as well as other websites, networks, etc., while ensuring compatibility with such devices as well as changing technologies, parameters, protocols, standards, etc.

With regard to a display notification, in one embodiment, power/display management logic 216 may facilitate a local power management component of mobile device 200 to lit-up only the required portion of the display screen that covers the notification, such as a text message, so save power by keeping the rest of the display screen off or dark. This technique is power-efficient as most of the notifications (e.g., social networking deals, text messages, deals, reminders, alerts, etc.) require merely a small portion of the display screen (e.g., about 20% of the display screen) to be displayed.

As part of the data mining process, data management logic 232 may include a filter to automatically and dynamically filter out any certain networking notifications (e.g., Facebook notifications, LinkedIn updates, RSS feed, exchange calendar entries/reminders, etc.) if, for example, the user is not actively using mobile device 200 or is logged out of the relevant websites, etc., by keeping communication with the relevant social networking and other websites over a cloud network. This technique can save additional power as it may significantly lower power system state residency of mobile device 200. In some embodiments, being user/device context-aware and power-aware, notification mechanism 110 may also propose a best channel (e.g., in terms of user/device context and/or low power consumption) to mobile notification mechanism 210 to provide a notification. For example, if the user has a Bluetooth headset paired with mobile device 200 that is in a noisy environment or in a backpack or in a pocket or purse, etc., sound management logic 218 may work to facilitate providing the notification as an audio alarm without, for example, turning on the display screen. Further, the user may be provided access, via user interface 224, and the ability to setup or configure mobile notification mechanism 210 is such a manner that certain notifications may be regarded as exceptions and provided using the full screen or a certain portion of the screen (e.g., 75% of the screen), etc.

In one embodiment, mobile notification mechanism 210 may be provided as a software application that can be downloaded on mobile device 200 and can then be accessed and used by the user via user interface 226 provided via the display screen of mobile device 200. Further, policy module 220 may be responsible for enabling mobile notification mechanism 210 based on the context of the device platform of mobile device 200. For example, based on user feedback relating to a notification, alternate notification schemes may be dynamically chosen, such as a display notification may be sent but the user may not respond within a particular time and after which both the display and the audio may be sent together. If the user, for example, still does not respond, then mobile notification mechanism 210 may not assume that the user is no longer available and have mobile device 200 rely on its one or more sensors (e.g., ambient noise, user or device movement, etc.) to collect or aggregate additional information that may be used as user and/or device contexts.

In some embodiments, users may acknowledge notifications with speech-based notification responses, such as upon seeing a notification, a user may talk back at the smartphone, such as mobile device 200, or simply ignore the notification or take a specific action. Further, in one embodiment, subsequent notification schemes may be determined by policy configuration logic 234 and communicated over to mobile notification mechanism 210, such as if a display notification is sent, but if the user does not respond to it within a predefined time period, a subsequent or backup notification combining the display and audio may be sent and if the user still does not respond, one or more sensors (e.g., ambient noise sensor, movement sensor, etc.) of mobile device 200 may be used to send the next notification to the user until an acknowledgement is received from the user, a particular number of notification attempts have been made, a predefined amount of time has passed, etc.

Furthermore, having notifications that are both context-aware and power-aware, in one embodiment, the best available communication channel may be chosen to deliver these notifications, such as if the user is using a Bluetooth headset that is paired with mobile device 200 when it is in a noisy environment or tucked away in a backpack or a purse, etc., an audio notification may be provided through the Bluetooth headset and/or an alarm may be sounded without turning on the display screen for being power-efficient by conserving battery power of mobile device 200. It is contemplated, however, that a user may change various settings, including those affecting power consumption, at mobile device 200, via user interface 224, such as the user may choose to have all or any number and/or type of notifications displayed on the display screen of mobile device 200 regardless of the resulting power consumption. In some embodiments, mobile device 200 may act as and perform functions of multiple computing devices, such as both the first and second computing devices including computing device 100 of FIG. 1 and mobile device 200, by performing the necessary logic in mobile device 200 with user acknowledgement of increased power consumption even in the absence of cloud or in case of loss of data connectivity with cloud or the cloud server, such as computing device 100 of FIG. 1.

It is contemplated that any number and type of components may be added to and/or removed from policy-based notification mechanism 110 and/or mobile notification mechanism 210 to facilitate various embodiments of the invention including adding, removing, and/or enhancing certain features. For brevity, clarity, and ease of understanding of the customization mechanism 110, many of the standard and/or known components, such as those of a computing device, are not shown or discussed here. It is contemplated that embodiments of the invention are not limited to any particular technology, topology, system, architecture, and/or standard and are dynamic enough to adopt and adapt to any future changes.

Figure 2B:
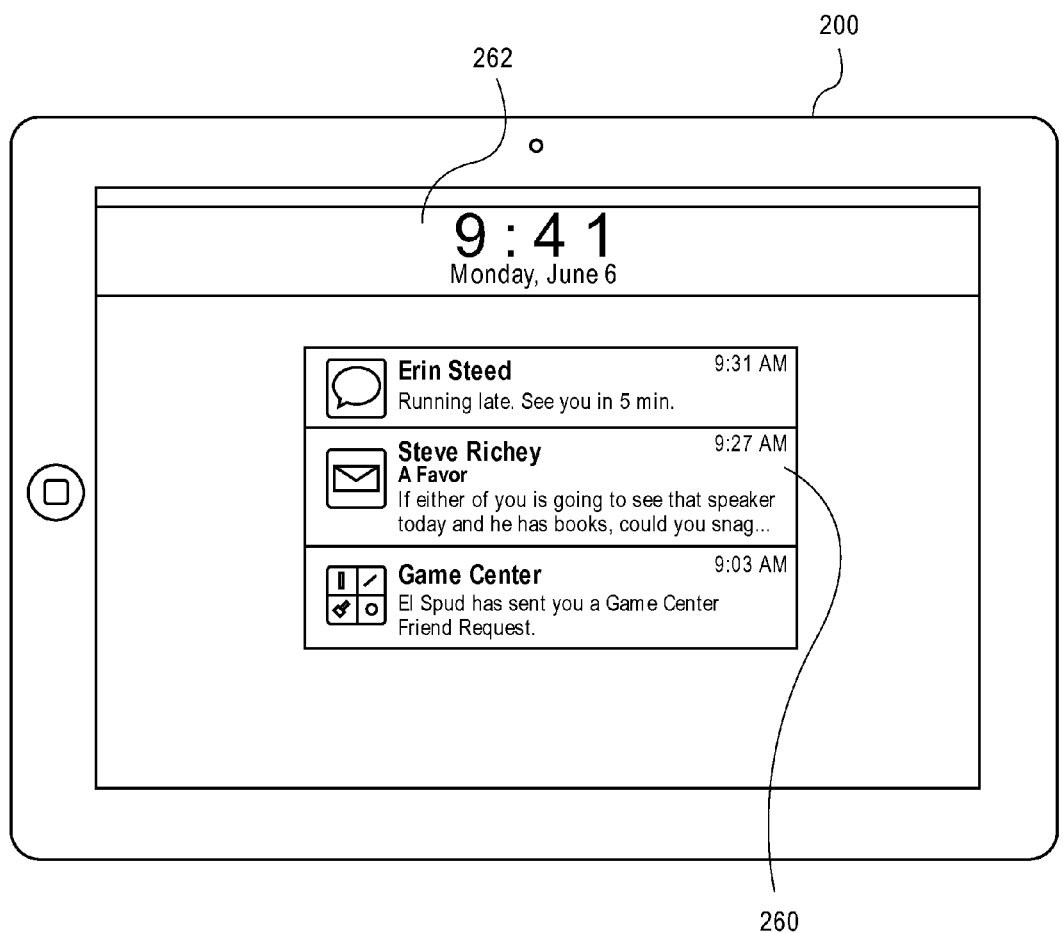
FIG. 2B illustrates a notification being displayed on a mobile computing device according to one embodiment.

FIG. 2B illustrates a notification 260 being displayed on a mobile computing device 200 according to one embodiment. In one embodiment, using policy-based navigation mechanism 110 and mobile navigation mechanism 210 of FIG. 2A, power-aware notification 260 is provided on a display screen 262 of mobile computing device 200 (e.g., a smartphone, a PDA, a tablet computer, etc.). It is to be noted that being power-aware and power-efficient, it is merely the section of the display screen 262 that is shown as occupied by the illustrated notification 260 is lit-up, while the rest of the display screen 262 remains dark, saving valuable power and consequently, extending the battery life of mobile device 200.

Figure 3A:
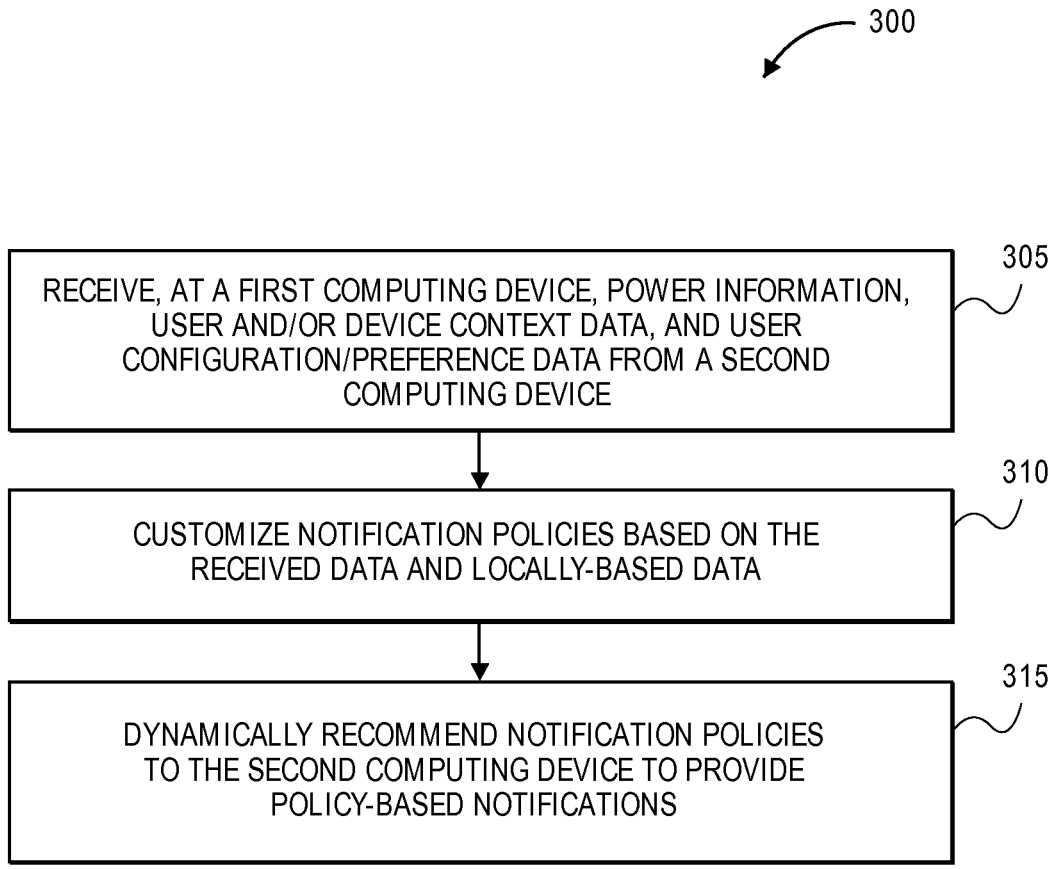
FIGS. 3A and 3B illustrates a method for facilitating policy-based notifications for computing devices according to one embodiment.
Figure 3B:
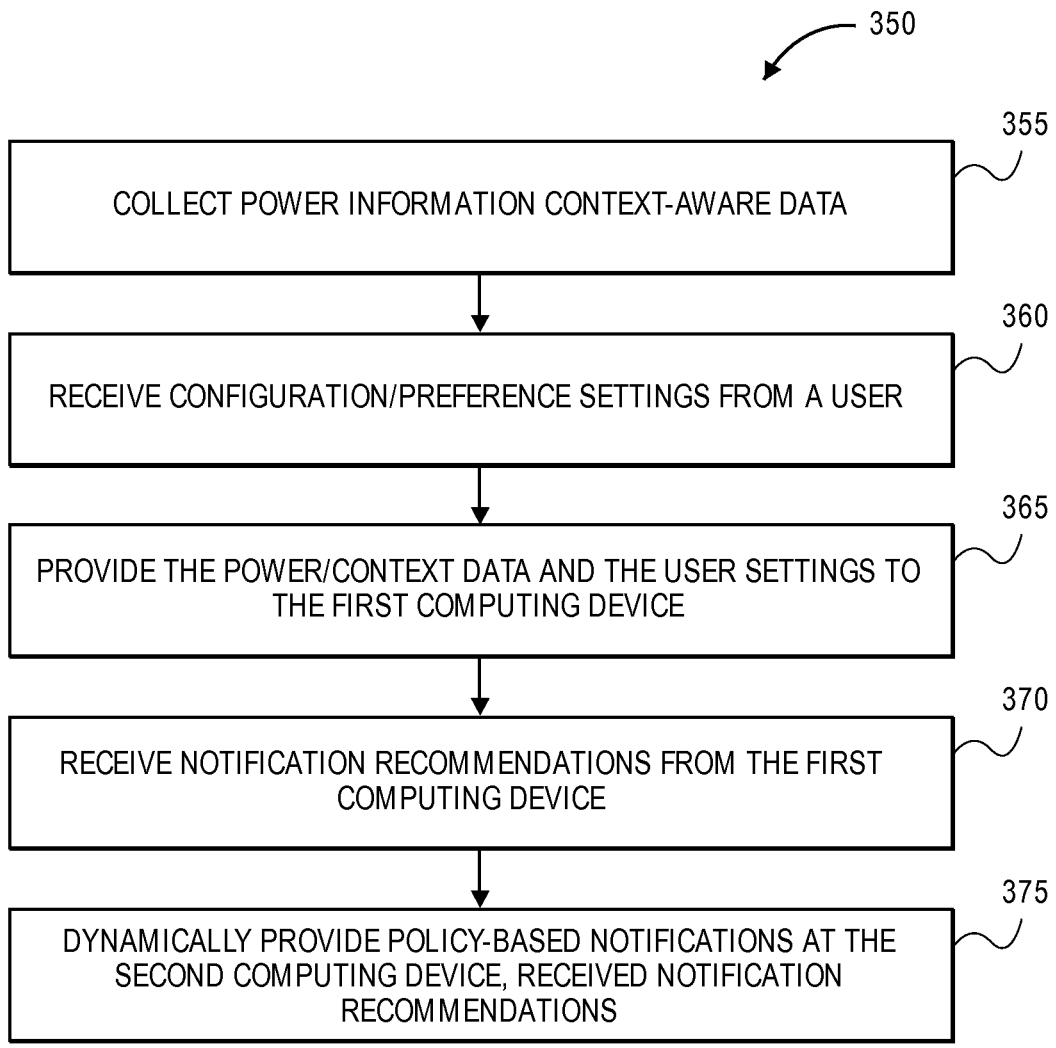

FIGS. 3A and 3B illustrates a method for facilitating policy-based notifications for computing devices according to one embodiment. Methods 300 and 350 may be performed by processing logic that may comprise hardware (e.g., circuitry, dedicated logic, programmable logic, etc.), software (such as instructions run on a processing device), or a combination thereof. In one embodiment, method 300 may be performed by dynamic policy-based notification mechanism 110 of FIG. 1 and method 350 may be performed by mobile notification mechanism 210 FIG. 2A.

Method 300 begins at block 305 receiving, at a first computing device (e.g., a server computer) employing the aforementioned dynamic policy-based notification mechanism 110 of FIG. 1, power information, user and/or device context data, and user configuration/preference settings from a second computing device (e.g., a mobile computing device, such as a smartphone, a tablet computer, etc.) employing the aforementioned mobile notification mechanism 210 of FIG. 2A. In some embodiments, certain data (e.g., context data) may be directly collected or aggregated or referred to by the first computing device, such as user's known calendar entries, user setup details, service provider contract details, roaming areas, limitations of the second computing device, etc. At block 310, notification policies are customized based on power and user/device context information, other details (e.g., calendar entries, contract details, etc.), etc. Customizing notification policies may include forming new notification policies and/or modifying existing notification policies.

At block 315, notification polices are dynamically recommended to the second computing device so that appropriate notifications may be provided, such as a power-efficient notification (e.g., text message) only covering a portion of the display screen, deferring notifications until, for example, the second computing device transitions back to the active state, batching notifications until, for example, a specific time or other threshold is reached. Further, based on customized notification policies, the first computing device may dynamically monitoring any number and type of sites that the second computing device subscribes to, such as Facebook, Google+, LinkedIn, Geo-fencing, etc., and various notification recommendations may be provided based on the customized notification policies and monitoring results of the dynamic monitoring.

Now referring to FIG. 3B, method 350 begins at block 355 with mobile notification mechanism 210 of FIG. 2A at the second computing device collecting or aggregating power information and context information (e.g., user context and/or second computing device context) for providing policy-based notifications that are power-aware and user/device context-aware. In addition to power and context information, at block 360, configuration/preference settings are received from a user of the second computing device via user interface provided by the mobile notification mechanism. At block 365, the collected power and context information and the received user configuration/preference settings are provided to the first computing device so customization of notification policies can be performed by policy-based notification mechanism at the first computing device. At block 370, notification recommendations, based on customized notification policies, are received at the second computing device and, at block 375, based on the received notification recommendations, customized policy-based notifications are provided at the second computing device. For example, as aforementioned, customized and policy-based notifications include power-efficient notifications that occupy partial display screen (as shown in FIG. 2B), audio alerts (without a display or graphics), full-screen displays (as requested by the user or necessitated), deferred notifications, batched notifications, prioritized notifications, Bluetooth-based notifications, social networking site-based notifications, etc.

Figure 4:
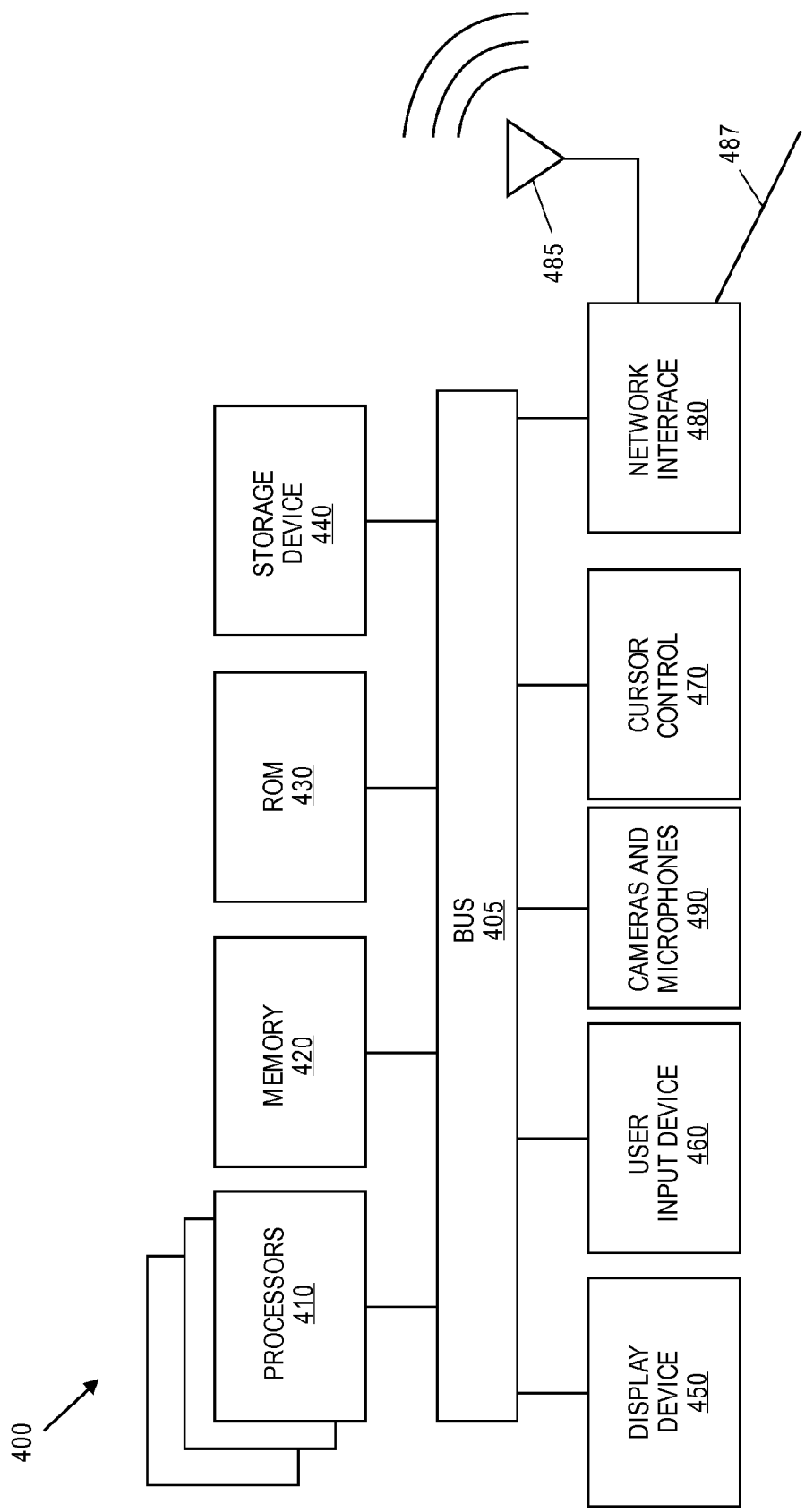
FIG. 4 illustrates computer system suitable for implementing embodiments of the present disclosure according to one embodiment of the invention.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 400 includes bus 405 (or a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: managing, at a first computing device, data including at least one of power-aware data and context-aware data; dynamically customizing, at the first computing device, notification policies based on the managed data; and generating, at the first computing device, policy-based notifications based on the customized notification policies, and transmitting the policy-based notifications to facilitate communication of the policy-based notifications. The policy-based notifications may include at least one of a power-aware notification and a context-aware notification.

Embodiments or examples include any of the above methods wherein managing is performed at a first computing device, and wherein the power-aware data relates to changing power status of a second computing device, and wherein the context-aware data includes device context-aware data relating to status of the second computing device or user context-aware data relating to user of the second computing device.

Embodiments or examples include any of the above methods wherein facilitating communication of policy-based notifications comprises dynamically displaying one or more of the policy-based notifications occupying a portion of a display screen of the second computing device based on one or more of the notification policies, wherein the policy-based notifications include one or more of a short message service (SMS), an email notification, an alarm, and a reminder.

Embodiments or examples include any of the above methods wherein facilitating communication of policy-based notifications further comprises dynamically transmitting an audio relating to the one or more policy-based notifications without having to display the one or more policy-based notifications based on one or more of the notification policies.

Embodiments or examples include any of the above methods wherein facilitating communication of policy-based notifications further comprises dynamically deferring one or more of the policy-based notifications, dynamically batching two or more of the policy-based notifications, and dynamically prioritizing one or more of the policy-based notifications based on one or more of the policy-based notification policies.

Embodiments or examples include any of the above methods wherein the first computing device comprises a server computing device, and wherein the second computing device comprises a mobile computing device including one or more of a smartphone, a tablet computer, and laptop computer.

Embodiments or examples include any of the above methods wherein customizing the notification policies comprises forming one or more new notification policies or modifying one or more existing notification policies based on the managed data.

In another embodiment or example, an apparatus comprises: data management logic to manage data including at least one of power-aware data and context-aware data; policy configuration logic to dynamically customize notification policies based on the managed data; and notification management logic to generate policy-based notifications based on the customized notification policies, wherein the notification management logic is further to transmit the policy-based notifications to facilitate communication of the policy-based notifications, wherein the policy-based notifications include at least one of a power-aware notification and a context-aware notification.

Embodiments or examples include the apparatus above wherein managing is performed at a first computing device, and wherein the power-aware data relates to changing power status of a second computing device, and wherein the context-aware data includes device context-aware data relating to status of the second computing device or user context-aware data relating to user of the second computing device.

Embodiments or examples include the apparatus above further comprising a display device at the second computing device to dynamically display one or more of the policy-based notifications occupying a portion of a display screen of the second computing device based on one or more of the notification policies, wherein the policy-based notifications include one or more of a short message service (SMS), an email notification, an alarm, and a reminder.

Embodiments or examples include the apparatus above further comprising a speaker at the second computing device to dynamically transmit an audio relating to the one or more policy-based notifications without having to display the one or more policy-based notifications based on one or more of the notification policies.

Embodiments or examples include the apparatus above wherein the notification management logic is further to provide recommendations relating to dynamically deferring one or more of the policy-based notifications, dynamically batching two or more of the policy-based notifications, and dynamically prioritizing one or more of the policy-based notifications based on one or more of the notification policies.

Embodiments or examples include the apparatus above wherein the first computing device comprises a server computing device, and wherein the second computing device comprises a mobile computing device including one or more of a smartphone, a tablet computer, and laptop computer.

Embodiments or examples include the apparatus above wherein the policy configuration logic is further to form one or more new notification policies or modifying one or more existing notification policies based on the managed data.

In another embodiment or example, a system comprises: a first computing device having a memory to store instructions, and a processing device to execute the instructions, the first computing device further having a policy-based notification mechanism to: manage, via data management logic, data including at least one of power-aware data and context-aware data; dynamically customize, via policy configuration logic, notification policies based on the managed data; and generate, via notification management logic, policy-based notifications based on the customized notification policies, wherein the notification management logic is further to transmit the policy-based notifications to facilitate communication of the policy-based notifications, wherein the policy-based notifications include at least one of a power-aware notification and a context-aware notification.

Embodiments or examples include the system above wherein managing is performed at a first computing device, and wherein the power-aware data relates to changing power status of a second computing device, and wherein the context-aware data includes device context-aware data relating to status of the second computing device or user context-aware data relating to user of the second computing device.

Embodiments or examples include the system above wherein the second computing device comprises a display device to dynamically display one or more of the policy-based notifications occupying a portion of a display screen of the second computing device based on one or more of the notification policies, wherein the policy-based notifications include one or more of a short message service (SMS), an email notification, an alarm, and a reminder.

Embodiments or examples include the system above wherein the second computing device comprises a speaker to dynamically transmit an audio relating to the one or more policy-based notifications without having to display the one or more policy-based notifications based on one or more of the notification policies.

Embodiments or examples include the system above wherein the policy-based notification mechanism is further to, via the notification management logic, provide recommendations relating to dynamically deferring one or more of the policy-based notifications, dynamically batching two or more of the policy-based notifications, and dynamically prioritizing one or more of the policy-based notifications based on one or more of the notification policies.

Embodiments or examples include the system above wherein the first computing device comprises a server computing device, and wherein the second computing device comprises a mobile computing device including one or more of a smartphone, a tablet computer, and laptop computer.

Embodiments or examples include the system above wherein the policy-based notification mechanism is further to, via the policy configuration logic, form one or more new notification policies or modifying one or more existing notification policies based on the managed data.

In another embodiment or example, an apparatus comprises means for performing any one or more of the operations mentioned above.

In yet another embodiment or example, at least one machine-readable medium comprising a plurality of instructions that in response to being executed on a computing device, causes the computing device to carry out a method according to any one or more of the operations mentioned above.

In yet another embodiment or example, at least one non-transitory or tangible machine-readable comprising a plurality of instructions that in response to being executed on a computing device, causes the computing device to carry out a method according to any one or more of the operations mentioned above.

In yet another embodiment or example, a computing device arranged to perform a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
    a processor operable to execute computer program logic;
    a memory operable to store the computer program logic executable by the processor to facilitate:
    data management logic to manage, in real-time, data including at least one of device context-aware data and user context-aware data, wherein the device context-aware data relates to behavior of the apparatus and wherein the user context-aware data relates to behavior of a user of the apparatus;
    policy configuration logic to dynamically customize, in real-time, notification policies based on the managed data including at least one of the device context-aware data and the user context-aware data, wherein the notification policies are further customized based on notification recommendations, wherein the notification recommendations are received based on at least one of user preferences, user exceptions, device limitations, and device status, wherein the notification recommendations are further received based on overriding priorities and emergencies; and
    notification management logic to generate customized notifications based on the customized notification policies and power information of the apparatus, wherein the customized notifications include power-efficient notifications include one or more of a text message occupying a minimal portion of a display screen, the minimal portion being necessary to display the text message, a voice message if the display device is to be kept turned off based on the device context-aware data or the user context-aware data, an alert or a call notification is placed in lieu of the text message and the voice message over a predetermined period of time, a deferred notification is sent to one or more family devices, and batching and communicating together two or more customized notifications, wherein the two or more customized notifications are batched on-demand based on a batching request from the user or automatically for being similarly relevant to a person, a family, a time period, a subject matter, and an event, and
    wherein the notification management logic is further to transmit the customized notifications to facilitate communication of the customized notifications, wherein one or more of the customized notifications are dynamically modified based on changes to the device context-aware data or the user context-aware data and at least one of user preferences, user exceptions, device limitations, and device status.

2. The apparatus of claim 1, further comprising a display device to dynamically display one or more of the customized notifications occupying a portion of a display screen of the display device based on one or more of the notification policies, wherein the customized notifications include one or more of a short message service (SMS), an email notification, an alarm, and a reminder.

3. The apparatus of claim 2, further comprising a speaker to dynamically transmit an audio relating to the one or more customized notifications without having to display the one or more customized notifications.

4. The apparatus of claim 1, wherein the processing device is further to facilitate the notification management logic to provide the notification recommendations relating to dynamically deferring one or more of the customized notifications, and dynamically prioritizing one or more of the customized notifications.

5. The apparatus of claim 1, wherein the processing device is further to facilitate the policy configuration logic to form one or more new notification policies or modifying one or more existing notification policies based on the managed data.

6. The apparatus of claim 1, wherein the device context-aware data relates to one or more apparatus-related conditions including the apparatus being one or more of turned off, placed in airplane mode, and placed in a purse or pocket, and wherein the user context-aware data relates to user activities of the user including one or more of sleeping, attending a meeting, having a family time, in a theater, and playing a sport, wherein the apparatus comprises a computing device including one or more of a desktop computer, a laptop computer, a tablet computer, a set-top box, and a smartphone.

7. The apparatus of claim 1, wherein the power-efficient notifications relates to changing power status of the apparatus, wherein the power-efficient notifications comprise one or more of a full-screen notification, a partial screen notification, an audio notification, a graphics notification, an animation notification, the deferred notification, a prioritized notification, a Bluetooth-based notification, and a social networking website-based notification, wherein the deferred notification includes an unimportant notification that is deferred, based on a notification recommendation, for a period of time or until an event has occurred, wherein the one or more of the customization notifications are dynamically based on overriding priorities and emergencies, wherein the prioritized notification includes an expedited notification that is prioritized based on a notification recommendation in response to a user preference or a predetermined criteria, wherein the predetermined criteria includes at least one of relevance and emergencies.

8. A method comprising:
managing, in real-time, data including at least one of device context-aware data and user context-aware data, wherein the device context-aware data relates to behavior of a device and wherein the user context-aware data relates to behavior of a user of the device;
dynamically customizing, in real-time, notification policies based on the managed data including at least one of the device context-aware data and the user context-aware data, wherein the notification policies are further customized based on notification recommendations, wherein the notification recommendations are received based on at least one of user preferences, user exceptions, device limitations, and device status, wherein the notification recommendations are further received based on overriding priorities and emergencies;
generating customized notifications based on the customized notification policies and power information of an apparatus, wherein the customized notifications include power-efficient notifications include one or more of a text message occupying a minimal portion of a display screen, the minimal portion being necessary to display the text message, a voice message if the display device is to be kept turned off based on the device context-aware data or the user context-aware data, an alert or a call notification is placed in lieu of the text message and the voice message over a predetermined period of time, a deferred notification is sent to one or more family devices, and batching and communicating together two or more customized notifications, wherein the two or more customized notifications are batched on-demand based on a batching request from the user or automatically for being similarly relevant to a person, a family, a time period, a subject matter, and an event; and
transmit the customized notifications to facilitate communication of the customized notifications, wherein one or more of the customized notifications are dynamically modified based on the device context-aware data or the user context-aware data and changes to at least one of user preferences, user exceptions, device limitations, and device status.

9. The method of claim 8, further comprising dynamically displaying one or more of the customized notifications occupying a portion of a display screen of the display device based on one or more of the notification policies, wherein the customized notifications include one or more of a short message service (SMS), an email notification, an alarm, and a reminder.

10. The method of claim 9, further comprising dynamically transmitting an audio relating to the one or more customized notifications without having to display the one or more customized notifications.

11. The method of claim 8, further comprising providing the notification recommendations relating to dynamically deferring one or more of the customized notifications, and dynamically prioritizing one or more of the customized notifications.

12. The method of claim 8, further comprising forming one or more new notification policies or modifying one or more existing notification policies based on the managed data.

13. The method of claim 8, wherein the device context-aware data relates to one or more apparatus-related conditions including the apparatus being one or more of turned off, placed in airplane mode, and placed in a purse or pocket, and wherein the user context-aware data relates to user activities of the user including one or more of sleeping, attending a meeting, having a family time, in a theater, and playing a sport, wherein the apparatus comprises a computing device including one or more of a desktop computer, a laptop computer, a tablet computer, a set-top box, and a smartphone.

14. The method of claim 8, wherein the power-efficient notifications relates to changing power status of the apparatus, wherein the power-efficient notifications comprise one or more of a full-screen notification, a partial screen notification, an audio notification, a graphics notification, an animation notification, the deferred notification, a prioritized notification, a Bluetooth-based notification, and a social networking website-based notification, wherein the deferred notification includes an unimportant notification that is deferred, based on a notification recommendation, for a period of time or until an event has occurred, wherein the one or more of the customization notifications are dynamically based on overriding priorities and emergencies, wherein the prioritized notification includes an expedited notification that is prioritized based on a notification recommendation in response to a user preference or a predetermined criteria, wherein the predetermined criteria includes at least one of relevance and emergencies.

15. At least one non-transitory machine-readable medium comprising instructions which when executed on a computing device, cause the computing device to carry out a method according to one or more operations comprising:
managing, in real-time, data including at least one of device context-aware data and user context-aware data, wherein the device context-aware data relates to behavior of a device and wherein the user context-aware data relates to behavior of a user of the device;
dynamically customizing, in real-time, notification policies based on the managed data including at least one of the device context-aware data and the user context-aware data, wherein the notification policies are further customized based on notification recommendations, wherein the notification recommendations are received based on at least one of user preferences, user exceptions, device limitations, and device status, wherein the notification recommendations are further received based on overriding priorities and emergencies;
generating customized notifications based on the customized notification policies and power information of an apparatus, wherein the customized notifications include power-efficient notifications include one or more of a text message occupying a minimal portion of a display screen, the minimal portion being necessary to display the text message, a voice message if the display device is to be kept turned off based on the device context-aware data or the user context-aware data, an alert or a call notification is placed in lieu of the text message and the voice message over a predetermined period of time, a deferred notification is sent to one or more family devices, and batching and communicating together two or more customized notifications, wherein the two or more customized notifications are batched on-demand based on a batching request from the user or automatically for being similarly relevant to a person, a family, a time period, a subject matter, and an event; and
transmit the customized notifications to facilitate communication of the customized notifications, wherein one or more of the customized notifications are dynamically modified based on changes to the device context-aware data or the user context-aware data and at least one of user preferences, user exceptions, device limitations, and device status.

16. The non-transitory machine-readable medium of claim 15, wherein the one or more operations further comprise dynamically displaying one or more of the customized notifications occupying a portion of a display screen of the display device based on one or more of the notification policies, wherein the customized notifications include one or more of a short message service (SMS), an email notification, an alarm, and a reminder.

17. The non-transitory machine-readable medium of claim 16, wherein the one or more operations further comprise dynamically transmitting an audio relating to the one or more customized notifications without having to display the one or more customized notifications.

18. The non-transitory machine-readable medium of claim 15, wherein the one or more operations further comprise providing the notification recommendations relating to dynamically deferring one or more of the customized notifications, and dynamically prioritizing one or more of the customized notifications.

19. The non-transitory machine-readable medium of claim 15, wherein the one or more operations further comprise forming one or more new notification policies or modifying one or more existing notification policies based on the managed data.

20. The non-transitory machine-readable medium of claim 15, wherein the device context-aware data relates to one or more apparatus-related conditions including the apparatus being one or more of turned off, placed in airplane mode, and placed in a purse or pocket, and wherein the user context-aware data relates to user activities of the user including one or more of sleeping, attending a meeting, having a family time, in a theater, and playing a sport, wherein the apparatus comprises a computing device including one or more of a desktop computer, a laptop computer, a tablet computer, a set-top box, and a smartphone.

21. The non-transitory machine-readable medium of claim 15, wherein the power-efficient notifications relates to changing power status of the apparatus, wherein the power-efficient notifications comprise one or more of a full-screen notification, a partial screen notification, an audio notification, a graphics notification, an animation notification, the deferred notification, a prioritized notification, a Bluetooth-based notification, and a social networking website-based notification, wherein the deferred notification includes an unimportant notification that is deferred, based on a notification recommendation, for a period of time or until an event has occurred, wherein the one or more of the customization notifications are dynamically based on overriding priorities and emergencies, wherein the prioritized notification includes an expedited notification that is prioritized based on a notification recommendation in response to a user preference or a predetermined criteria, wherein the predetermined criteria includes at least one of relevance and emergencies.

* * * * *